United States Patent
Hume et al.

[11] Patent Number: 5,618,616
[45] Date of Patent: Apr. 8, 1997

[54] MULTI-LAYER LINER FOR WASTE WATER SYSTEM REHABILITATION

[75] Inventors: James M. Hume, St. Augustine; Joseph T. Daniele, Jacksonville, both of Fla.

[73] Assignee: CCI Spectrum, Inc., Jacksonville, Fla.

[21] Appl. No.: 426,420

[22] Filed: Apr. 19, 1995

Related U.S. Application Data

[63] Continuation of Ser. No. 126,376, Sep. 24, 1993, abandoned.

[51] Int. Cl.⁶ .................................................. B32B 27/00
[52] U.S. Cl. ................................ 428/319.3; 428/318.6; 428/317.7
[58] Field of Search ........................... 428/304.4, 317.1, 428/317.7, 318.6, 319.3, 318.8, 321; 405/38, 150.1, 303, 150.2

[56] References Cited

U.S. PATENT DOCUMENTS

| | | | |
|---|---|---|---|
| 3,615,969 | 10/1971 | Hegg | 156/78 |
| 4,016,323 | 4/1977 | Volovsek | 428/321 |
| 4,122,203 | 10/1978 | Stahl | 428/309 |
| 4,421,827 | 12/1983 | Phillips | 428/418 |
| 5,002,438 | 3/1991 | Strong | 405/303 |
| 5,032,197 | 7/1991 | Trimble | 156/71 |

Primary Examiner—Christopher Raimund
Attorney, Agent, or Firm—Robert C. Curfiss

[57] ABSTRACT

A technique and device for rehabilitating or repairing waste water system components or the like, comprising a spray-applied, multi-layer liner which seals the components and imparts structural integrity. The liner comprises a primer layer, a first moisture barrier layer, a foam layer and a second moisture barrier layer. The first and second moisture barrier layers are preferably made of the same material and form a skin on both sides of the internal foam layer. The combination of the foam layer and the two moisture barrier layers imparts structural strength and rigidity to the cured liner. Preferably, the primer layer is an epoxy, the moisture barrier layers a polyurea and isocyanate blend, and the foam layer a polyurethane.

10 Claims, 1 Drawing Sheet

MULTI-LAYER LINER FOR WASTE WATER SYSTEM REHABILITATION

This is a continuation of application(s) Ser. No. 08/126,376 filed on Sep. 24, 1993, now abandoned.

BACKGROUND OF THE INVENTION

The invention relates generally to the rehabilitation or repair of waste water system components, such as manholes, sewer pipes, lift stations or clarifiers, through the application of a multi-layer liner. More particularly, the invention relates to the rehabilitation of such systems where the multi-layer liner is spray-applied and comprises a primer layer, a first moisture barrier layer, a foam intermediate layer and a second moisture barrier layer. Even more particularly, the invention comprises such a liner where the primer layer is composed of an epoxy, the first and second moisture barrier layers are composed of polyurea and isocyanate polymer blends, and the foam layer is composed of a polyurethane foam.

Deterioration of waste water system components is a severe and growing problem. Originally built of brick, block or concrete construction, these components develop leaks, cracks and holes due to age, erosion, corrosion and ground water intrusion. Leakage from old manholes and sewer lines contaminates the environment and sometimes result in catastrophic damage with respect to clean-up and repair costs.

Since the cost of repairing the components is typically much less than the cost of replacement, many techniques have been developed to repair and rehabilitate waste water system components. For example, it is known to recast manholes and the like through the use of forms and poured concrete, such as shown in U.S. Pat. No. 5,032,197 to Trimble. Because this process is very labor intensive, many techniques are directed toward spray-applied liners. For example, Strong in U.S. Pat. No. 5,002,438 teaches the use of sprayed cement to form a liner inside the deteriorating structure. Spray-applied epoxy, acrylic or polyurethane liners are also known, as is the use of resin impregnated substrates, such as felt, as taught in U.S. Pat. No. 5,017,258 to Brown et al. The current spray-applied systems suffer from moisture, delamination, shrinkage and structural weakness problems resulting from the typical environment encountered in the repair operation.

It is an object of this invention to provide a technique and particular liner structure for repairing waste water system components which is spray-applied and does not suffer from the problems relating to moisture, delamination, shrinkage and structural weakness.

It is a further object to provide such an invention which increases the structural integrity of the repaired component due to the unique composition of the layers within the multi-layer laminate applied to the component.

It is still another object to provide such an invention which can be applied in wet conditions to any shape surface having any number of irregularities and has a rapid cure time.

SUMMARY OF THE INVENTION

The invention is a technique and device for rehabilitating or repairing waste water system components or the like, comprising a spray-applied, multi-layer liner which seals the components and imparts structural integrity. The liner comprises a primer layer, a first moisture barrier layer, a foam layer and a second moisture barrier layer. The primer layer can be applied to wet surfaces and is the bonding layer between the waste water system component, typically a concrete or cement surface, and the first moisture barrier layer. The first and second moisture barrier layers are preferably made of the same material and form a skin on both sides of the internal foam layer. The combination of the foam layer and the two moisture barrier layers imparts structural strength and rigidity to the cured liner. Except for the primer layer, the layers of the liner are all rapid curing materials. Preferably, the primer layer is an epoxy, the moisture barrier layers a polyurea and isocyanate blend, and the foam layer a polyurethane.

DETAILED DESCRIPTION OF THE INVENTION

Figure 1:
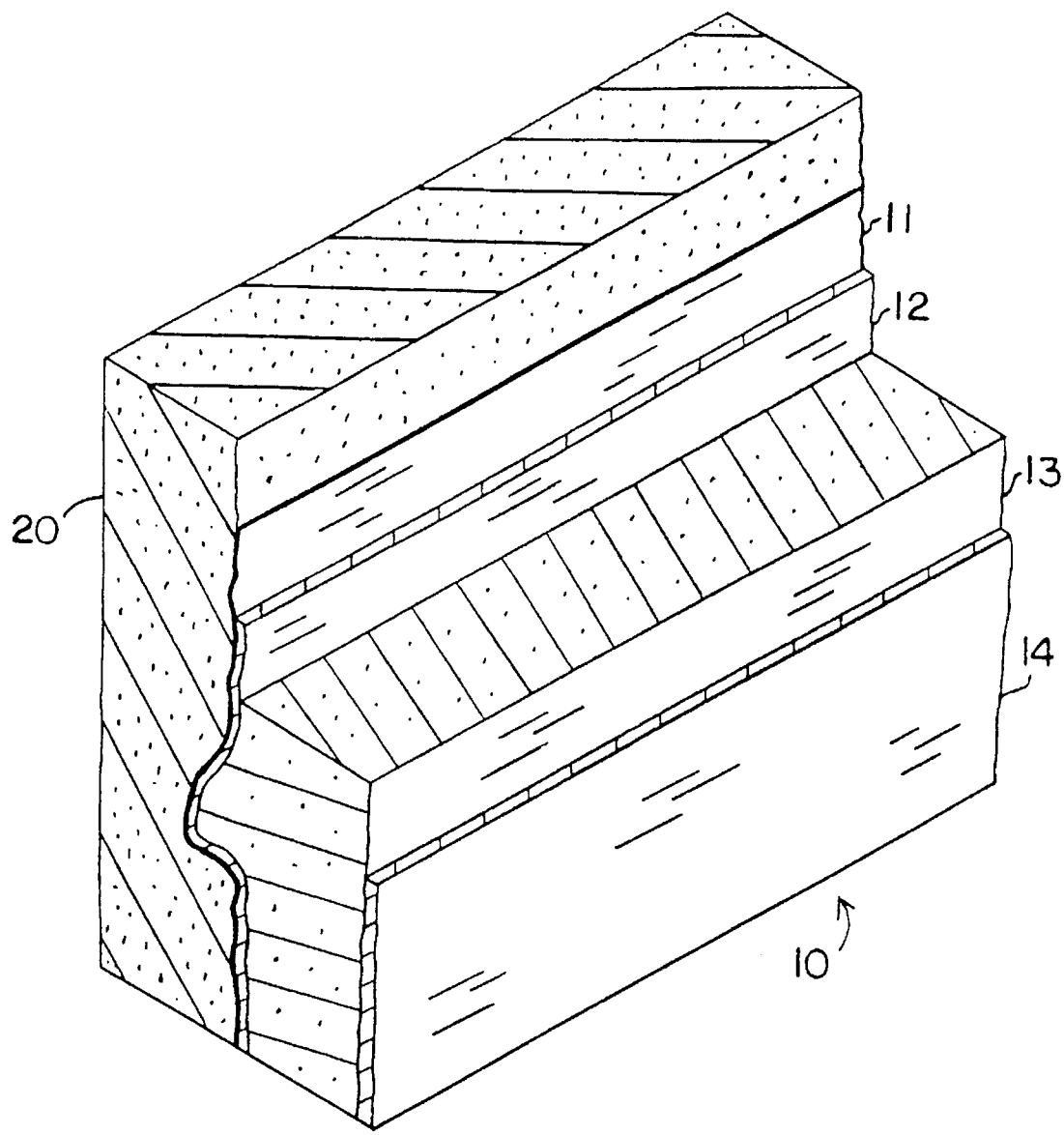
FIG. 1 is cross-sectional perspective view of a portion of the multi-layer liner as applied to a concrete substrate.

A multi-layer liner is spray-applied using conventional compressed air techniques to rehabilitate and repair deteriorated waste water systems or the like. The liner components have rapid cure rates and the cured liner imparts structural strength and integrity to the rehabilitated components.

Waste water system components, such as manholes, sewer pipes, lift or pump stations, and clarifiers, degrade and deteriorate over time—resulting in loss of integrity and Leakage of liquid components into the environment. Likewise, many other similar concrete or metal structures deteriorate and need to be repaired in a rapid, effective manner.

As illustrated by the sectional depiction in FIG. 1, the invention comprises a multi-layer liner 10 applied to a concrete, brick, block, metal or the like substrate 20. Typically, the substrate 20 will be a deteriorated manhole or sewer pipe having an irregular surface with cracks or holes. The liner 10 comprises a primer layer 11, a first moisture barrier layer 12, an intermediate foam layer 13, and a second moisture barrier layer 14. The liner 10 is applied so as to cover the entire internal surface of the substrate 20, which is usually generally tubular in configuration, although any shape or configuration is possible and the technique is applicable without regard to the particular shape of the substrate 20.

The substrate 20 surface is initially prepared using high pressure water or abrasive sand blasting to remove all hard contaminants, any micro-organisms or living matter such as mold, mildew, etc., and any loose degraded materials of the substrate itself. This abrading step results in a clean surface with an optimized surface for adhesion of the liner 20. Next the primer layer 11 is spray-applied using conventional compressed air spraying devices. The primer layer is a material capable of adhering to the substrate 20 even if wet, and is preferably an epoxy material. The primer layer 11 is applied to a necessary thickness to insure adhesion of the first moisture barrier 12 to the substrate 20, and is generally applied to a dry film thickness between 2 and 10 mils, and preferably at a thickness of approximately 5 mils. The primer layer 12 is coated over the entire surface to be repaired.

The next step is to spray-apply, again using conventional techniques, the first moisture barrier layer 12 onto the primer layer 11. The first moisture barrier layer 12 is composed of a polymer blend of separate components which are mixed as they exit the spray nozzle, the components reacting to form a hard material upon curing. Preferably, a blend of a polyurea component and an isocyanate component is utilized, with the two components formulated to have similar viscosities. The first moisture barrier layer 12 is applied to a dry film thickness of preferably between 40 to 80 mils, and even more preferably at a thickness of 60 mils. The material used for the first moisture barrier should have a gel time of less than a few seconds and preferably less than 3 seconds, with total cure time of less than 60 seconds and preferably less than 30 seconds, and have minimal shrinkage during curing. This rapid cure is necessary to insure integrity of the first moisture barrier 12 even when applied under non-optimum conditions. The preferred polyurea and isocyanate blend has a tensile strength of greater than 1500 psi, an elongation percentage of 125%, tear strength of 350 psi, a shore D hardness of 55 and an 100% modulus of greater than 1500. The first moisture barrier layer 12 is impermeable to water and other fluids and is a structurally rigid layer adhered to the substrate 20 so as to remain adhered under pull test conditions of greater than 300 psi. The first moisture barrier layer 12 is applied to completely cover the primer layer 11.

The next step is to spray-apply, again using conventional techniques, an internal foam layer 13. The foam layer 13 is preferably composed of a polyurethane blend which rapidly foams and cures upon exiting the spray nozzle of the application equipment. Preferably, the foam material is primarily closed cell and has a rise time of less than 30 seconds and preferably less than 10 seconds. The foam layer 13 is applied preferably to result in a dry thickness of at least 500 mils, although the foam layer 13 can be thicker overall or in selected areas if necessary. The foam layer 13 as applied creates a smoother inner surface, its bulk filling any holes, depressions or cracks in the substrate 20 surface. The foam layer 13 preferably has a density of between 4.5 to 5.5 pounds per cubic foot, a compressive strength of between 105 to 110 psi, a closed cell content of over 90 percent, and shear strength of between 225 to 250 psi. As with the other layers, the foam layer 13 is applied over the entire previous layer.

Finally, the second moisture barrier layer 14, preferably composed of the same material as the first moisture barrier layer 12, is spray-applied over the entire surface of foam layer 13. Preferably, the second moisture barrier layer 14 is also applied to a dry film thickness of between 40 and 80 mils, and even more preferably to a thickness of approximately 60 mils. If necessary due to circumstances, greater thicknesses of first moisture barrier layer 12 and second moisture barrier layer 14 may be utilized.

The resulting liner 10 is a water impermeable barrier strongly adhered to the substrate 20 which prevents liquids from leaking out of the waste water system and also prevents ground water from entering the system. More importantly in terms of longevity, the liner 10 is a structural member which strengthens the components of the waste water system no matter to what extent they have deteriorated. Previously used water impermeable liners, whether composed of epoxy, acrylic, polyurethane or resin impregnated substrates, are not strongly adhered to the substrate and tend to delaminate over time. These typical liners do not reinforce or impart any structural strength to the system components. The multi-layer liner 10 of the invention not only creates a liquid barrier, it adds to the strength of the waste water system components by providing a reinforcing member which is structurally rigid due to its multi-layer composition. The liner 10 is a stressed skin panel, comprised of a structurally rigid foam internal layer 13 bounded by two adhered surface layers—first moisture barrier layer 12 and second moisture barrier layer 14—which are under stress due to the rapid cure rate of the material when applied. This rapid cure time does not allow internal stresses created by the small amount of shrinkage during curing to be relaxed, as occurs in sprayed films with long cure times. The principles of stressed skin panels, well known in the construction industry for walls of large buildings, provide for a structural member with increased structural strength and integrity of multiple factors beyond that of the individual components taken separately. Thus, the combination of the stressed skin panel created by the multi-layer combination of first moisture barrier layer 12, foam internal layer 13 and second moisture barrier layer 14 adhered to the waste water system component results in a repaired component with exceptional structural characteristics due to the reinforcing properties of the liner 10, and is a vastly improved system over those in use today.

It is understood that obvious equivalents and substitutions may become known to those skilled in the art. The true scope and definition of the invention therefore is to be as set forth in the following claims.

We claim:

1. A multi-layered liner comprising:

a primer layer, a first and second moisture barrier layer, and an intermediate foam layer, said first moisture barrier layer is impervious to moisture, and said foam layer is sandwiched between said first barrier layer and said second barrier layer.

2. The liner of claim 1, where said first moisture barrier layer and said second moisture barrier layer are composed of the same material.

3. The liner of claim 2, where said first moisture barrier layer and said second moisture barrier layer are composed of a polyurea and isocyanate blend.

4. The liner of claim 1, where said foam layer is composed of a polyurethane.

5. The liner of claim 1, where said primer layer is composed of an epoxy.

6. The liner of claim 1, where said first moisture barrier layer and said second moisture barrier layer are less than 80 mils in thickness.

7. The liner of claim 1, where said foam layer is greater than 500 mils in thickness.

8. The liner of claim 6, where said foam layer is greater than 500 mils in thickness.

9. The liner of claim 1, where said first moisture barrier layer, said foam layer and said second moisture barrier layer have cure rates of less than 60 seconds.

10. The liner of claim 9, where said cure rates are less than 30 seconds.

* * * * *